United States Patent
Sarkar et al.

(10) Patent No.: US 9,277,473 B2
(45) Date of Patent: Mar. 1, 2016

(54) INTELLIGENT IRAT HANDOVER REQUESTS

(71) Applicant: Telefonaktiebolaget L M Ericsson (publ), Stockholm (SE)

(72) Inventors: Debasish Sarkar, Irvine, CA (US); Manmohan Munjal, Gurgaon (IN); Ayan Sen, Gurgaon (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 89 days.

(21) Appl. No.: 13/731,782

(22) Filed: Dec. 31, 2012

(65) Prior Publication Data

US 2014/0187247 A1 Jul. 3, 2014

(51) Int. Cl.
*H04W 36/30* (2009.01)
*H04W 24/10* (2009.01)
*H04W 36/00* (2009.01)
*H04W 36/14* (2009.01)

(52) U.S. Cl.
CPC .......... *H04W 36/30* (2013.01); *H04W 36/0083* (2013.01); *H04W 24/10* (2013.01); *H04W 36/0061* (2013.01); *H04W 36/14* (2013.01)

(58) Field of Classification Search
CPC ..... H04W 36/14; H04W 36/30; H04W 36/32; H04W 12/08; H04W 48/16; H04W 36/0083; H04W 36/0061; H04W 24/10
USPC ............. 455/432.1, 432.2, 432.3, 434, 435.2, 455/436–444; 370/331–332
See application file for complete search history.

(56) References Cited

U.S. PATENT DOCUMENTS

| | | | |
|---|---|---|---|
| 7,245,919 B2 * | 7/2007 | Lau et al. ........................ | 455/450 |
| 8,380,208 B2 * | 2/2013 | Matsuo ................. | H04W 24/10 |
| | | | 455/444 |
| 2003/0073437 A1 * | 4/2003 | Yuen ............................. | 455/432 |
| 2005/0096051 A1 * | 5/2005 | Lee et al. ........................ | 455/438 |
| 2006/0234709 A1 * | 10/2006 | Marinescu et al. ............ | 455/436 |
| 2007/0184838 A1 * | 8/2007 | Van Der Velde et al. ..... | 455/436 |

(Continued)

FOREIGN PATENT DOCUMENTS

| | | |
|---|---|---|
| EP | 2 343 923 A1 | 7/2011 |
| WO | 2014102666 A1 | 7/2014 |

OTHER PUBLICATIONS

3GPP TS 25.331 version 10.8.0 Release 10 (Universal Mobile Telecommunications System (UMTS); Radio Resource Control (RRC); Protocol specification, Jul. 2012).*

(Continued)

*Primary Examiner* — Magdi Elhag
(74) *Attorney, Agent, or Firm* — Rothwell, Figg, Ernst & Manbeck, P.C.

(57) ABSTRACT

Devices and methods for intelligent handover requests and management are disclosed. IRAT handover failure can be prevented by ensuring that user equipment (UE) is asked to handover to a target cell that it has already measured, and that resource allocation in the base station sub-system (BSS) is made in the correct cell. For instance, a radio network controller (RNC) can maintain cell identification and corresponding node information when an updated measurement control message is sent to the UE. According to certain aspects, a relocation cancellation message can be sent from an RNC to a mobile switching center (MSC) if a new measurement report, such as a 3a report, is received by the RNC.

18 Claims, 18 Drawing Sheets

(56) References Cited

U.S. PATENT DOCUMENTS

| | | | |
|---|---|---|---|
| 2009/0135730 A1* | 5/2009 | Scott et al. | 370/252 |
| 2009/0137246 A1* | 5/2009 | Xing et al. | 455/434 |
| 2009/0270079 A1* | 10/2009 | Han et al. | 455/414.1 |
| 2009/0325577 A1* | 12/2009 | Furtenback et al. | 455/436 |
| 2010/0248640 A1* | 9/2010 | MacNaughtan et al. | 455/67.11 |
| 2010/0273472 A1 | 10/2010 | Drewes et al. | |
| 2011/0164590 A1* | 7/2011 | Wang et al. | 370/331 |
| 2011/0237269 A1* | 9/2011 | Chen | 455/450 |
| 2012/0039181 A1* | 2/2012 | Aziz et al. | 370/241 |
| 2012/0163338 A1* | 6/2012 | Zhang et al. | 370/331 |
| 2012/0243504 A1* | 9/2012 | Hsieh et al. | 370/331 |
| 2012/0270550 A1* | 10/2012 | Shi | 455/436 |
| 2013/0077521 A1* | 3/2013 | Feng et al. | 370/252 |
| 2013/0090111 A1* | 4/2013 | Chang | 455/422.1 |
| 2013/0183984 A1* | 7/2013 | Shi et al. | 455/439 |
| 2013/0210436 A1* | 8/2013 | Srinivasan et al. | 455/436 |
| 2014/0066072 A1* | 3/2014 | Carlsson | 455/436 |

OTHER PUBLICATIONS

Ramamurthy, G. et al., "Handover Between GSM (2G), UMTS (3G) and Wireless Local Area Networks (WLANs)," Deep Study Report for Advanced Telecommunications, May 1, 2008, XP055114157, 10 pages.

Document N2B000178, "UMTS/UMTS Handover," 3GPP TSG-CN 2 SWGB Meeting #4, Milan, Italy, Feb. 14-16, 2000, vol. TSG CN, No. Madrid, Spain, Mar. 20, 2000, XP050047079, 18 pages.

International Search Report mailed May 8, 2014, PCT/IB2013/051053, 3 pages.

* cited by examiner

1) Hour: 04 Minute: 46 Second: 19 Millisecond: 258 Name: RRC_MEASUREMENT_CONTROL   UE_CONTEXT: 1046
RNC_MODULE_ID: 11   RNC_ID_1: 301   C_ID_1: 14179   RNC_ID_2: 301   C_ID_2: 3319   RNC_ID_2: 301   C_ID_3:
EVENT_VALUE_INVALID   RNC_ID_3: EVENT_VALUE_INVALIDC_ID_4: EVENT_VALUE_INVALID   RNC_ID_4: EVENT_VALUE_INVALID
PDU_TYPE: 1   PROTOCOL_ID: 0   MESSAGE_DIRECTION: SENT   MESSAGE_LENGTH: 69   MESSAGE_CONTENTS:
value DL-DCCH-Message ::= {   integrityCheckInfo   messageAuthenticationCode '00000000 00000000 00000000
00000010'B   rrc-MessageSequenceNumber 0   message measurementControl : r3 : {   measurementControl-r3 { rrc-
TransactionIdentifier 0   measurementIdentity 3   measurementCommand modify : { measurementType interRATMeasurement : {
interRATCellInfoList {   removedInterRATCellList removeSomeInterRATCells : {   1   3   5   7
9   11   13   17   29   30   31   newInterRATCellList {   interRATCellID 1
technologySpecificInfo gsm : {   interRATCellIndividualOffset 0   bsic {   ncc 5   bcc 2   frequency-band
dcs1800BandUsed   bcch-ARFCN 38   interRATCellID 3   technologySpecificInfo gsm : {   interRATCellID 5   technologySpecificInfo
gsm : {   interRATCellIndividualOffset 0   bsic {   ncc 1   bcc 1   frequency-band dcs1800BandUsed bcch-ARFCN 35   interRATCellIndividualOffset 0   bsic {   ncc 0   bcc 5
frequency-band dcs1800BandUsed bcch-ARFCN 32   bsic {   ncc 2   bcc 3   frequency-band dcs1800BandUsed bcch-ARFCN 40
interRATCellID 7   technologySpecificInfo gsm : {   interRATCellID 9   technologySpecificInfo gsm : {
interRATCellIndividualOffset 0   technologySpecificInfo gsm : {   interRATCellIndividualOffset 0   bsic {   ncc 0   bcc 3
interRATCellID 11   technologySpecificInfo gsm : {   bsic {   ncc 5   frequency-band dcs1800BandUsed bcch-ARFCN 45
frequency-band   dcs1800BandUsed   bcch-ARFCN 36   bcc 6   frequency-band dcs1800BandUsed bcch-ARFCN 36
interRATCellIndividualOffset 0   bsic {   bcc 5   interRATCellIndividualOffset 0   bsic {   ncc 4   bcc 0
interRATCellID 17technologySpecificInfo gsm : {   ncc 7   interRATCellID 29technologySpecificInfo gsm : {
frequency-band dcs1800BandUsed bcch-ARFCN 42   bcc 3   frequency-band dcs1800BandUsed bcch-ARFCN 45
interRATCellIndividualOffset 0   bsic {   ncc 3   interRATCellIndividualOffset 0   bsic {   ncc 2   bcc 4
interRATCellID 30technologySpecificInfo gsm : {   interRATCellID 31technologySpecificInfo gsm : {
frequency-band dcs1800BandUsed bcch-ARFCN 46   bcc 5   frequency-band dcs1800BandUsed bcch-ARFCN 37
reportCriteria interRATReportingCriteria : { interRATEventList {   event3a : {   thresholdOwnSystem -15   w 0
thresholdOtherSystem -87hysteresis 0   timeToTrigger ttt100   reportingCellStatus withinActSetOrVirtualActSet-
interRATcells : e4

FIG. 3A

2) Hour: 04 Minute: 46 Second: 27 Millisecond: 535 Name: RRC_MEASUREMENT_REPORT   UE_CONTEXT: 1046   RNC_MODULE_ID: 11
C_ID_1: 14179   RNC_ID_1: 301   C_ID_2: 3319   RNC_ID_2: 301   C_ID_3: EVENT_VALUE_INVALID   RNC_ID_3: EVENT_VALUE_INVALID   C_ID_4: EVENT_VALUE_INVALID   RNC_ID_4: EVENT_VALUE_INVALID PDU_TYPE: 2   PROTOCOL_ID: 0
MESSAGE_DIRECTION: RECEIVED   MESSAGE_LENGTH: 12   MESSAGE_CONTENTS: value UL-DCCH-Message ::= { integrityCheckInfo {
messageAuthenticationCode '00000000 00000000 00000000 00000010'B   rrc-MessageSequenceNumber 0   message
measurementReport : {   measurementIdentity 3   measuredResults interRATMeasuredResultsList : {   gsm : {   gsm-CarrierRSSI '101000'B   cellToReportList {   eventID e3a   bsicReported
bsicReported verifiedBSIC : 11   eventResults interRATEventResults : {
verifiedBSIC : 11

FIG. 3B

3) Hour: 04 Minute: 46 Second: 27 Millisecond: 545 Name: RRC_MEASUREMENT_CONTROL UE_CONTEXT: 1046 RNC_MODULE_ID: 11 C_ID_1: 3319
RNC_ID_1: 301 C_ID_2: 619 RNC_ID_2: 301 C_ID_3: 14179 RNC_ID_3: 301 C_ID_4: EVENT_VALUE_INVALID RNC_ID_4: EVENT_VALUE_INVALID
PDU_TYPE: 1 PROTOCOL_ID: 0 MESSAGE_DIRECTION: SENT MESSAGE_LENGTH: 64 MESSAGE_CONTENTS: value DL-DCCH-Message ::= {
integrityCheckInfo { messageAuthenticationCode '00000000 00000000 00000000 00000010'B rrc-MessageSequenceNumber 0 } message
measurementControl : { measurementControl-r3 { rrc-TransactionIdentifier 2 measurementIdentity 3 measurementCommand modify : { measurementType
interRATMeasurement : { interRATCellInfoList { removedInterRATCellList removeSomeInterRATCells : {

| 29 | 30 | 31 |   | 3 | 5 | 7 | 9 | 11 | 13 | 17 |
|---|---|---|---|---|---|---|---|---|---|---|
|   |   | newInterRATCellList { |   | interRATCellID 3 | technologySpecificInfo gsm : { | interRATCellIndividualOffset 0 |   | bsic { | ncc 4 | bcc 7 |
| frequency-band dcs1800BandUsed bcch-ARFCN 37 |   |   |   | interRATCellID 5 | technologySpecificInfo gsm : { | interRATCellIndividualOffset 0 |   | bsic { | ncc 1 | bcc 5 |
| frequency-band dcs1800BandUsed bcch-ARFCN 40 |   |   |   | interRATCellID 7 | technologySpecificInfo gsm : { | interRATCellIndividualOffset 0 |   | bsic { | ncc 7 | bcc 4 |
| frequency-band dcs1800BandUsed bcch-ARFCN 44 |   |   |   | interRATCellID 9 | technologySpecificInfo gsm : { | interRATCellIndividualOffset 0 |   | bsic { | ncc 5 | bcc 5 |
| frequency-band dcs1800BandUsed |   |   |   | interRATCellID 11 |   | technologySpecificInfo gsm : { |   | interRATCellIndividualOffset 0 | bsic { | ncc 2 |
| bcc 2 | frequency-band dcs1800BandUsed |   |   | interRATCellID 13 technologySpecificInfo gsm : { |   |   |   | interRATCellIndividualOffset 0 |   | bsic { |
| ncc 7 | bcc 0 | frequency-band dcs1800BandUsed bcch-ARFCN 35 |   | interRATCellID 17 technologySpecificInfo gsm : { |   |   |   | interRATCellIndividualOffset 0 |   | bsic { |
| ncc 6 | bcc 7 | frequency-band dcs1800BandUsed bcch-ARFCN 46 |   | interRATCellID 29 technologySpecificInfo gsm : { |   |   |   | interRATCellIndividualOffset 0 |   | bsic { |
| ncc 3 | bcc 5 | frequency-band dcs1800BandUsed bcch-ARFCN 33 |   | interRATCellID 30 technologySpecificInfo gsm : { |   |   |   | interRATCellIndividualOffset 0 |   | bsic { |
| ncc 3 | bcc 4 | frequency-band dcs1800BandUsed bcch-ARFCN 43 |   | interRATCellID 31 technologySpecificInfo gsm : { |   |   |   | interRATCellIndividualOffset 0 |   | bsic { |
| ncc 7 | bcc 1 | frequency-band dcs1800BandUsed bcch-ARFCN 32 |   | reportCriteria interRATReportingCriteria : { interRATEventList { event3a : { |   |   |   |   |   |   |
|   | thresholdOwnSystem -15 w 0 | thresholdOtherSystem -87 hysteresis 0 |   | timeToTrigger ttt100 |   | reportingCellStatus withinActSetOrVirtualActSet- |   |   |   |   | interRATcells : e4

FIG. 3C

4) Hour: 04 Minute: 46 Second: 27 Millisecond: 546 Name: RANAP_RELOCATION_REQUIRED UE_CONTEXT: 1046 RNC_MODULE_ID: 11 C_ID_1: 3319 RNC_ID_1: 301 C_ID_2: 619 RNC_ID_2: 301 C_ID_3: 14179 RNC_ID_3: 301 C_ID_4: EVENT_VALUE_INVALID RNC_ID_4: EVENT_VALUE_INVALID PDU_TYPE: EVENT_VALUE_INVALID PROTOCOL_ID: 2 MESSAGE_DIRECTION: SENT MESSAGE_LENGTH: 103 MESSAGE_CONTENTS: value RANAP-PDU ::= initiatingMessage : { procedureCode 2 criticality reject value RelocationRequired : { protocolIEs { id 56 criticality reject value RelocationType : ue-involved id 4 criticality ignore value Cause : radioNetwork : relocation-desirable-for-radio-reasons id 60 criticality ignore value SourceID : sAI : { pLMNidentity '04F494'H lAC '7D01'H sAC '3763'H id 62 criticality reject value TargetID : cGI : { pLMNidentity '04F494'H lAC '001A'H cI '1965'H id 7 criticality reject value ClassmarkInformation2 : '33035758A6'H id 8 criticality ignore value ClassmarkInformation3 : '601404CF652302002480'H id 20 criticality ignore value OldBSS-ToNewBSS-Information : '071D40001AC8AAAB541A955AA22920C112000600044184211A267AED96E000'H

FIG. 3D

5) Hour: 04 Minute: 46 Second: 27 Millisecond: 999 Name: RANAP_RELOCATION_COMMAND
      UE_CONTEXT: 1046     RNC_MODULE_ID: 11     C_ID_1: 3319     RNC_ID_1: 301
      C_ID_2: 619     RNC_ID_2: 301     C_ID_3: 14179     RNC_ID_3: 301     C_ID_4:
EVENT_VALUE_INVALID    RNC_ID_4: EVENT_VALUE_INVALID PDU_TYPE: EVENT_VALUE_INVALID
      PROTOCOL_ID: 2  MESSAGE_DIRECTION: RECEIVED   MESSAGE_LENGTH: 32
      MESSAGE_CONTENTS: value RANAP-PDU ::= successfulOutcome : {     procedureCode 2
      criticality reject   value RelocationCommand : {     protocolIEs {    id 14    criticality
ignore   value L3-Information : '062B12230E40236305634195030620A50C244D93'H GSM A-I/F DTAP - Handover Command
Protocol Discriminator: Radio Resources Management messages
0000 .... = Skip Indicator: 0
.... 0110 = Protocol discriminator: Radio Resources Management messages (6)
DTAP Radio Resources Management Message Type: Handover Command (0x2b)
Cell Description
 Cell Description
  ..01 0... = NCC: 2
.... .010 = BCC: 2
BCCH ARFCN(RF channel number): 35
Channel Description 2 - Description of the first channel, after time
Channel Description 2
     0000 1... = TCH/F + FACCH/F and SACCH/F
 .... .110 = Timeslot: 6
 010. .... = Training Sequence: 2
...0 .... = Hopping channel: No
.... 00.. = Spare
Single channel : ARFCN 35
Handover Reference
Handover Reference
Handover reference value: 99
Power Command and access type
 Power Command and access type
 0... .... = ATC: Sending of Handover access is mandatory
 .0.. .... = EPC_mode: Channel(s) not in EPC mode
  ..0. .... = FPC_EPC: FPC not in use/C not in use for uplink power control

FIG. 3E

6) Hour: 04 Minute: 46 Second: 27 Millisecond: 999 Name: RRC_HANDOVER_FROM_UTRAN_COMMAND
    UE_CONTEXT: 1046    RNC_MODULE_ID: 11    C_ID_1: 3319    RNC_ID_1: 301    C_ID_2: 619
    RNC_ID_2: 301    C_ID_3: 14179    RNC_ID_3: 301    C_ID_4: EVENT_VALUE_INVALID    RNC_ID_4:
EVENT_VALUE_INVALID    PDU_TYPE: 1    PROTOCOL_ID: 0 MESSAGE_DIRECTION: SENT
    MESSAGE_LENGTH: 30    MESSAGE_CONTENTS: value DL-DCCH-Message ::= { integrityCheckInfo {
    messageAuthenticationCode '00000000 00000000 00000000 00000010'B    rrc-
MessageSequenceNumber 0    message handoverFromUTRANCommand-GSM : r3 : {
    handoverFromUTRANCommand-GSM-r3 {    rrc-TransactionIdentifier 0 toHandoverRAB-Info {    rab-
Identity gsm-MAP-RAB-Identity : '00000001'B    cn-DomainIdentity cs-domain    re-
EstablishmentTimer useT314    frequency-band dcs1800BandUsed gsm-message gsm-MessageList : { gsm-
Messages {    00000110 00101011 00010010 00100011 000'B -- truncated --

Message name: Handover Command
Message PDU(9octets):062B12230000000000

RR Management Message:
06 0000....    Skip Indicator = 0
    ....0110    Protocol Discriminator = 6 :RR Message
2B 00101011    Message Type = 43 :Handover Command
    Handover Command:
    (3GPP TS44.018 9.1.15)
    Cell Description:
    (3GPP TS44.018 10.5.2.2)
12 00......    High Part of BCCH ARFCN = 0
  ..010...    NCC = 2
  ....010    BCC = 2
23 00100011    Low Part of BCCH ARFCN = 35
    Channel Description 2:
    (3GPP TS44.018 10.5.2.5a)
    Channel type and TDMA offset:
00 00000...    CHANNEL_TYPE = 0 :TCH/F + FACCH/F and SACCH/M by TN
    .....000    TN = 0
00 000.....    TSC = 0
   ...0....    Hopping = 0 :Non hopping
   ....00..    Spare bits = 00b
   ......00    ARFCN = 0
00 00000000
00 00000000    Handover Reference = 0
    Power Command Access Type:

FIG. 3F

7) Hour: 04 Minute: 46 Second: 28 Millisecond: 936 Name: RRC_HANDOVER_FROM_UTRAN_FAILURE UE_CONTEXT: 1046
RNC_MODULE_ID: 11   C_ID_1: 3319   RNC_ID_1: 301   C_ID_2: 619   RNC_ID_2: 301   C_ID_3: 14179   RNC_ID_3: 301
C_ID_4: EVENT_VALUE_INVALID   RNC_ID_4: EVENT_VALUE_INVALID PDU_TYPE: 2   PROTOCOL_ID: 0 MESSAGE_DIRECTION:
RECEIVED   MESSAGE_LENGTH: 7   MESSAGE_CONTENTS: value UL-DCCH-Message ::= { integrityCheckInfo {
messageAuthenticationCode '00000000 00000000 00000000 00000000 00000010'B   rrc-MessageSequenceNumber 0   message
handoverFromUTRANFailure : {   rrc-TransactionIdentifier 0 interRAT-HO-FailureCause physicalChannelFailure : NULL

FIG. 3G

| IRAT CELL ID | 3A MEASUREMENT CONTROL-SETUP t=1 | | | 3A MEASUREMENT CONTROL-MODIFY (1) t=2 | | | 3A MEASUREMENT CONTROL-MODIFY (2) t=4 | | |
|---|---|---|---|---|---|---|---|---|---|
| | NCC | BCC | BCCH ARFCN | NCC | BCC | BCCH ARFCN | NCC | BCC | BCCH ARFCN |
| interRATCellID 4 | 7 | 4 | 39 | | | | | | |
| interRATCellID 5 | 2 | 3 | 41 | 5 | 3 | 40 | 1 | 5 | 40 |
| interRATCellID 6 | 5 | 3 | 32 | | | | | | |
| interRATCellID 7 | 2 | 2 | 40 | 0 | 5 | 32 | 7 | 4 | 44 |
| interRATCellID 8 | 1 | 4 | 41 | | | | | | |
| interRATCellID 9 | 5 | 7 | 39 | 2 | 5 | 45 | 5 | 5 | 37 |
| interRATCellID 10 | 4 | 0 | 37 | | | | | | |
| interRATCellID 11 | 5 | 4 | 45 | 0 | 3 | 36 | 0 | 3 | 36 |
| interRATCellID 12 | 2 | 1 | 34 | 6 | 5 | 36 | | | |
| interRATCellID 13 | 7 | 5 | 35 | | | | 7 | 0 | 46 |
| interRATCellID 14 | 7 | 4 | 45 | | | | | | |
| interRATCellID 15 | 5 | 6 | 32 | 4 | 0 | 42 | 6 | 7 | 33 |
| interRATCellID 16 | 1 | 7 | 37 | | | | | | |
| interRATCellID 17 | 1 | 1 | 42 | | | | | | |

INTELLIGENT IRAT HANDOVER REQUESTS

TECHNICAL FIELD

The present invention relates generally to improving transmission quality in wireless networks and, more particularly, to methods and devices for intelligent handover requests and processing.

BACKGROUND

In order to maintain the highest service quality and continuity for a wireless user, user equipment (UE) will not only maintain a connection with its serving cell, but also monitor neighboring cells. A UE will typically perform mobility decisions, such as handover and cell reselection, towards base stations in the same radio access technology (RAT), but also towards additional networks or RATs. Accordingly, a UE (and one or more network entities) often monitor and evaluate serving cell quality, initiate periodic cell search activity for candidate neighbor cells, perform various measurements regarding neighboring cells, and perform mobility evaluations, e.g., determining whether the UE should move to another serving cell.

If a better serving cell than the current serving cell is identified, handover to the other cell can be initiated. The handover can be requested to, for example, the same carrier (intra-frequency handover), to cells on other carriers (inter-frequency handover) and to other cells of a different RAT (inter-RAT handover). The handover itself may consist of multiple steps, such as a handover initiation followed by radio link establishment with the target cell. This process may be understood, for instance, with respect to the exemplary signal flow illustrated in FIG. 1.

Referring to the example of FIG. 1, an IRAT handover procedure is initiated upon the reception of a measurement report 102 by a radio network controller (RNC), for instance a serving RNC (SRNC), from a UE in a Cell-DCH state. The measurement may be, for example, a 2d or 6b measurement report according to a Radio Resource Control (RRC) protocol. After evaluation of the measurement report 102, the link may be placed into a Compressed Mode Control state, which places gaps in the downlink and uplink transmissions, allowing the UE to perform measurements on neighboring cells. If the measurement report 102 indicates that the current frequency is below an acceptable threshold, the RNC can send a measurement control message 104 to the UE to start measurements on listed neighboring cells. For instance, in the case of an inter-RAT (IRAT) handover, such as from Universal Mobile Telecommunications System (UMTS) to Global System for Mobile Communications (GSM) RATs, the UE may start measurements on neighboring GSM cells. When the 3a criteria are fulfilled, the UE sends a measurement report 106, including the measurements on the neighboring GSM cells, to the RNC. The RNC evaluates the report and proceeds with the execution of the IRAT handover.

To execute the handover, the RNC sends a relocation required message 108 to the Mobile Switching Center (MSC) to request handover to the GSM network and starts a timer, $T_{relocprep}$. In the example of FIG. 1, the message 108 contains identification of the target cell, information about mobile capabilities, and security information. The MSC generates a handover request message 110, which is sent to the target base station sub-system (BSS). When the BSS receives the handover request message 110, it takes the necessary actions to allow the UE to access the radio resources of the BSS. Once resource allocation 112 has been completed, the BSS returns a handover request acknowledgement 114 to the MSC. A relocation command 116 will then be sent by the MSC to the RNC. The RNC stops the timer $T_{relocprep}$ and starts the timer $T_{relocoverall}$, and upon receipt of the relocation command 116, sends an RRC handover from Universal Terrestrial Radio Access Network (UTRAN) command 118 to the UE, which contains the Handover Reference number previously allocated by the BSS. The RNC may also include which Radio Access Bearers (RABs) are handed over to GSM in the handover message.

The UE can then access the new radio resource using the Handover Reference number contained in the handover access message 118. The target BSS uses this reference number to ensure that the correct mobile device is accessing the system for handover. Accordingly, the BSS may send a handover detect message to the MSC. When the UE is successfully communicating with the BSS, a handover access/complete message 120 will be sent by the UE to the BSS, which will in turn send a handover complete message 122 to the MSC. The MSC will then initiate an IU Release Command 124. The $T_{relocoverall}$ timer is stopped as the IU release command is received by the RNC, according to the Radio Access Network Application Part (RANAP) protocol. Radio links used by the UE can then be deleted on the UTRAN side.

However, existing implementations fail to provide intelligent handover requests and processing that can accommodate certain scenarios discussed herein.

SUMMARY

According to some embodiments, a method for requesting handover of a UE in a communication network includes sending, from an RNC, a first measurement control message to the UE, which associates a plurality of cell identifiers with corresponding node identification information. The method further includes receiving, at the RNC, a first measurement report from the UE, which includes a selected cell identifier from the plurality of cell identifiers. In certain aspects, the selected cell identifier is associated with the selected node identification information. A cell identification list that associates one or more of the plurality of cell identifiers with updated node identification information is generated. However, the RNC maintains the selected node information associated with the selected cell identifier. The method also includes sending, from the RNC, a second measurement control message to the UE based on the generated cell identification list. After sending the second measurement control message and before receiving a second measurement report from the UE, the method includes sending from the RNC a relocation required message to an MSC, where the relocation required message includes one or more of the selected cell identifier and the selected node identification information.

According to some embodiments, the method further includes receiving, at the RNC, a second measurement report from that UE that includes a new cell identifier; evaluating the second measurement report to determine if a new cell has been identified as a strongest candidate cell; and if a new cell has been identified as the strongest candidate cell, and the RNC has not received a relocation command from the MSC, sending a relocation cancel message to the MSC. The method may further include, after the sending of a relocation cancel message to the MSC, receiving a relocation cancel acknowledgement message from the MSC and sending, from the RNC, an updated relocation required message, where the updated relocation required message includes node identification information associated with the new cell identifier.

According to some embodiments, a radio network controller (RNC) is provided that includes data storage, a network interface, and a processor connected to one or more of the data storage and network interface. The processor may be configured to send a first measurement control message to the UE, which associates a plurality of cell identifiers with corresponding node identification information. The processor may be further configured to receive a first measurement report from the UE, which includes a selected cell identifier from the plurality of cell identifiers. In certain aspects, the selected cell identifier is associated with the selected node identification information. A cell identification list that associates one or more of the plurality of cell identifiers with updated node identification information can be generated by the processor. However, the processor maintains the selected node information associated with the selected cell identifier. The processor is further configured to send a second measurement control message to the UE based on the generated cell identification list. After sending the second measurement control message and before receiving a second measurement report from the UE, the processor may send a relocation required message to an MSC, where the relocation required message includes one or more of the selected cell identifier and the selected node identification information.

According to some embodiments, a method for requesting handover of user equipment (UE) in communication network includes receiving, at a radio network controller (RNC), a first measurement report from the UE. The report may include a first cell identification, wherein the first cell identification is associated with first node identification information. The method further includes sending, from the RNC, a relocation required message to a mobile switching center (MSC). The relocation required message may include the first node identification information. After sending the relocation required message to the MSC, the RNC receives a second measurement report from the UE that includes a second cell identification, wherein the second cell identification is associated with second node identification information. The method further includes evaluating the second measurement report to determine if a new cell has been identified as a strongest candidate cell, and if a new cell has been identified as the strongest candidate cell, and if the RNC has not received a relocation command from the MSC, sending a relocation cancel message to the MSC.

According to some embodiments, the method also includes receiving, at the RNC, a relocation cancel acknowledgement message from the MSC; and sending, from the RNC, a modified relocation required message to the MSC, wherein the relocation required message includes the second node identification information.

According to some embodiments, a radio network controller RNC is provided that includes data storage, a network interface, and a processor connected to one or more of the data storage and network interface. The processor is configured to receive a first measurement report from the UE. The report may include a first cell identification, wherein the first cell identification is associated with first node identification information. The processor is further configured to send a relocation required message to a mobile switching center (MSC). The relocation required message may include the first node identification information. After sending the relocation required message to the MSC, the process is configured to receive a second measurement report from the UE that includes a second cell identification, wherein the second cell identification is associated with second node identification information. The processor is further configured to evaluate the second measurement report to determine if a new cell has been identified as a strongest candidate cell, and, if a new cell has been identified as the strongest candidate cell, and the RNC has not received a relocation command from the MSC, send a relocation cancel message to the MSC.

According to some embodiments, a method for managing a handover request includes receiving, at a mobile switching center (MSC), a first relocation required message from a radio network controller (RNC) including first node identification information. The method further includes receiving, from the RNC, a relocation cancel message and sending a relocation cancel acknowledgement message to said RNC, when the relocation cancel message is received before a relocation command based on the first node identification information is sent to the RNC.

According to some embodiments, a Mobile Switching Center (MSC) is provided, which includes a network interface, data storage, and a processor connected to one or more of the network interface and data storage. The processor is configured to receive a first relocation required message from a radio network controller (RNC) including first node identification information. The processor is further configured to receive a relocation cancel message and send a relocation cancel acknowledgement message to said RNC, when the relocation cancel message is received before a relocation command based on the first node identification information is sent to the RNC.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIGS. 3A-3G illustrate an exemplary call flow.

FIG. 11 is a table illustrating cell identification entries in accordance with exemplary embodiments.

DETAILED DESCRIPTION

Particular embodiments of the present invention are directed to methods and devices for intelligent handover requests and management of handover requests.

Figure 1:
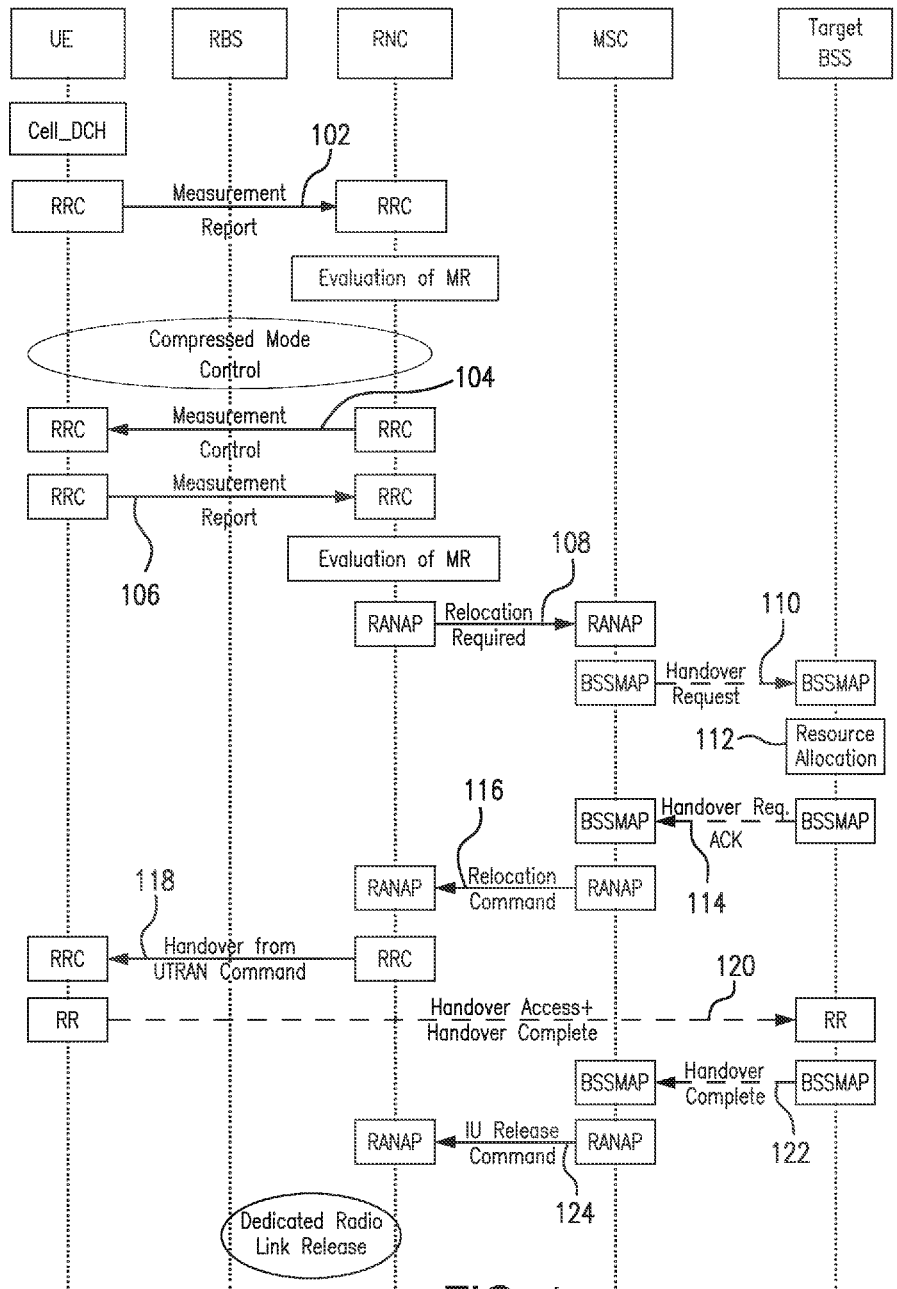
FIG. 1 is an exemplary signaling diagram illustrating a handover request.
Figure 2:
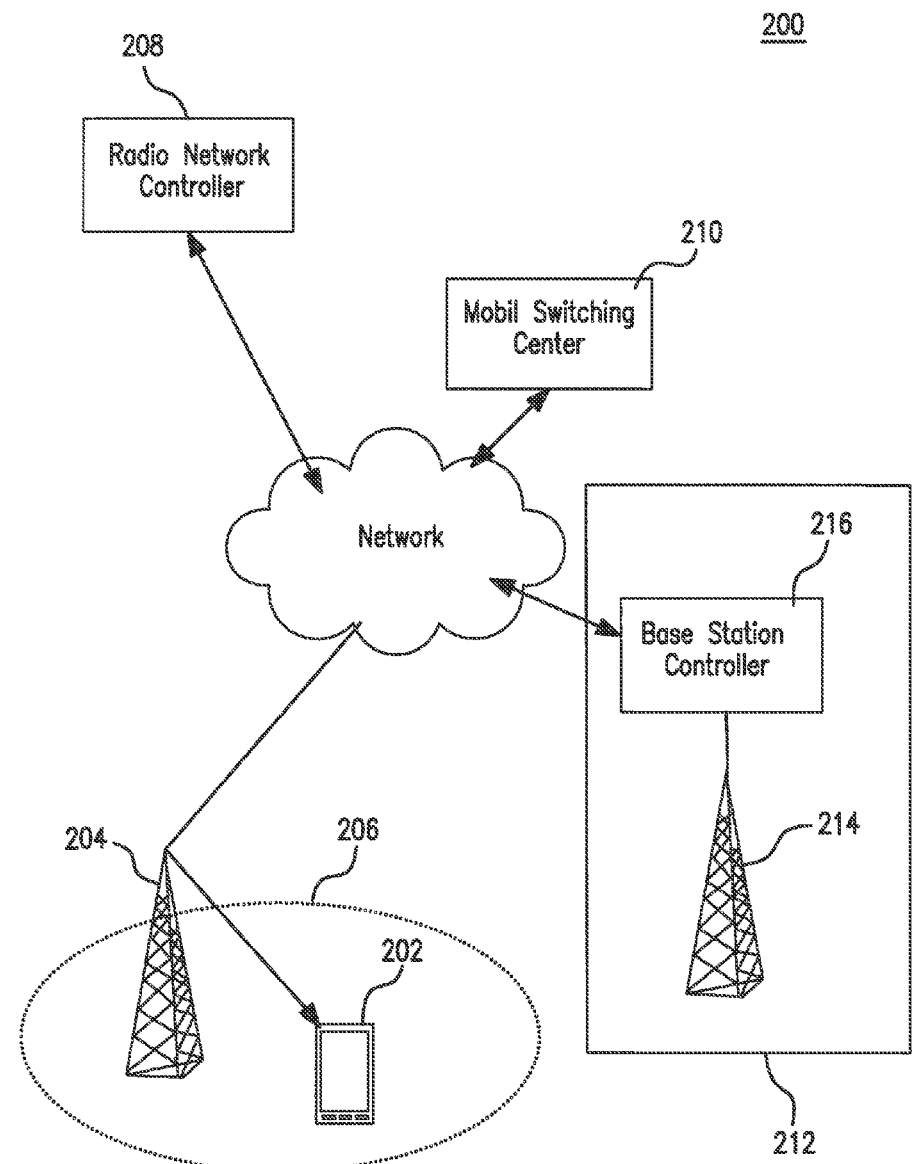
FIG. 2 is an illustration of a wireless communication network in accordance with exemplary embodiments.

Referring to FIG. 2, a wireless communication network 200 in accordance with exemplary embodiments includes a base station 204 serving user equipment (UE) 202 in a serving cell 206. The base station 204 may be in communication with, for instance via a network connection, one or more of a Radio Network Controller (RNC) 208, Mobile Switching Center (MSC) 210, and a Base Station Subsystem (BSS) 212. BSS 212 may include, for example, a base station controller 216 and another base station 214. Base station 204 may be, for example, a UTRAN base station and base station 214 can be, for example, a GSM base station.

During a handover, an event can occur between the most recent measurement reported by a UE and a relocation request command being sent to an MSC. For instance, during an inter-RAT (IRAT) handover, such as from UMTS to GSM, a soft handover event can occur between the reporting of a measurement event, such as Event 3a by the UE 202, and the RNC 208 sending a relocation required command to an MSC 210, such as an RANAP relocation required messages. The soft handover event may be, for example, one or more of Event 1a, 1b, and 1c as described in accordance with the UMTS and 3GPP Long Term Evolution (LTE) standards. Event 1a may refer to the situation where a primary Common Pilot Channel (CPICH) enters into the reporting range, Event 1b may refer to the situation where a primary CPICH leaves the reporting range, and Event 1c may refer to the situation where a non-active primary CPICH becomes better than an active primary CPICH. The expression "soft handover" may refer to a scenario where a wireless device, such as UE 202, becomes simultaneously connected to two or more cells. In contrast, during a "hard handover," the channel in the source cell is released and then the channel in a target cell is engaged.

Existing implementations have shown certain drawbacks, for instance, in the case of a soft handover cell addition or deletion occurring between a Measurement Report 3a being reported by the UE and the RANAP relocation required message being sent by the SRNC to the MSC. This can, in effect, cause the GSM combined Neighbor List to be modified in the RNC, which sends an updated Measurement Control Message (modify) to the UE. The RNC subsequently sends a RANAP relocation required message to the MSC with reference to the neighbor index reported by the UE in the last measurement report message (Measurement Identity 3). However, the neighbor index now points to a different GSM cell after the Active Set Update. According to some embodiments, an Event 3a may refer to the situation where UMTS cell quality has moved below a threshold, and a GSM cell quality has moved above a threshold. In other words, a Measurement Report 3a may indicate that a GSM cell would be preferable to an existing UMTS cell due to a change in link quality.

In a first problem scenario according to some embodiments, no 3a Measurement Report is sent by UE 202 after RNC 208 has sent a 3a Measurement Control message (modify) that removes some interRATCells and replaces them with new target GSM cell information. If the new Measurement Report is not received by RNC 208 before sending a RANAP Relocation Required request to MSC 210, the identified interRATCellID, and corresponding node information, is with respect to the new Measurement Control message (modify) but with reference to the old 3a Measurement Report (reporting the gsm Carrier RSSI of a different BSIC BCCH combination as per the earlier 3a Measurement Control message).

In a second problem scenario, a 3a Measurement Report is sent by UE 202 after RNC 208 has sent a 3a Measurement Control message (modify) removing some interRATCells and replacing them with new target GSM cell information, and after the RNC has already sent a RANAP Relocation Required request to the MSC 210. The 3a Measurement Report can be received by the RNC at any time before sending a RRC Handover from UTRAN command to the UE, and may indicate that a different cell is actually the strongest.

Some problems with existing implementations, including aspects of the above-identified scenarios, may be understood with respect to the following sequence of events and signals, which are illustrated with the example call flow of FIGS. 3A-3G:

1) In a first measurement control message sent from an SRNC to a UE, for instance, a Measurement Control message for Event 3a (measurementIdentity 3), cell identifiers are associated with node identification information. For example, a cell ID, such as interRATCellID 11, may correspond to node information ncc 0 bcc 3 bcch-ARFCN 36 as shown in FIG. 3A.

2) The subsequent measurement report from the UE, such as RRC Measurement Report 3a (measurementIdentity 3), verifies the Base Station Identification Code (BSIC), 11 in the present example, which corresponds to ncc 0 bcc3 bcch-ARFCN 36, for instance, with GSM Carrier Received Signal Strength Indicator (RSSI) 40, as shown in FIG. 3B.

3) A subsequent Measurement Control Message can modify the node information corresponding to a cell ID. For instance, in the example of FIG. 3C, interRATCellID 11 can be modified to correspond to ncc 2 bcc 2 bcch-ARFCN 35.

4) The RNC may then send relocation request, such as an RANAP Relocation Required command to the MSC, indicating the GSM cell corresponding to the node information, ncc 2 bcc 2 bcch-ARFCN 35 in the present example, as shown in FIG. 3D.

5) The MSC then sends a relocation command to the RNC, for instance, with an RANAP protocol data unit (PDU) containing the GSM Handover Command indicating the target cell (ncc 2 bcc 2 bcch-ARFCN 35 and Handover Reference value 99 in the present example, as shown by FIG. 3E).

6) In the present example, the RNC then sends a UTRAN handover command to the UE with the GSM message to perform handover to target GSM cell having ncc 2 bcc 2 bcch-ARFCN 35, as shown in FIG. 3F.

7) A "Handover From UTRAN Failure" follows, which indicates a failed IRAT Handover attempt, as shown in FIG. 3G.

As illustrated in the above sequence of events, the exemplary UE had originally reported interRATCellID 11, corresponding to ncc 0 bcc 3 bcch-ARFCN 36. However, due to an Active Set Update procedure between the reporting and handover request, a new measurement control message was sent, that modified the node information corresponding to interRATCellID 11 to ncc 2 bcc 2 bcch-ARFCN 35. However, the UE had not measured this GSM neighbor earlier. Further, after receiving the new measurement control message (with measurementIdentity 3), the UE did not provide a measurement report to the RNC. This could be, for instance, because the neighbors did not satisfy the 3a criteria. However, the RNC sent the RANAP Relocation Required Command to the MSC with reference to the new interRATCellID 11 (corresponding to ncc 2 bcc2 bcch-ARFCN 35) which was never reported by the UE. This can result in the UE to making an IRAT attempt to a weak GSM cell, thereby leading to IRAT Handover failure, such as the failure illustrated in FIG. 3G.

According to some embodiments, transmission quality for a user can be improved, for instance, by avoiding the handover failure described above, through the implementation of intelligent handover decisions and management. For example, a handover request cancellation process can be used. According to certain aspects, a relocation cancellation message can be sent from an RNC to an MSC if a new measurement report, such as a 3a report, is received by the RNC.

Figure 4:
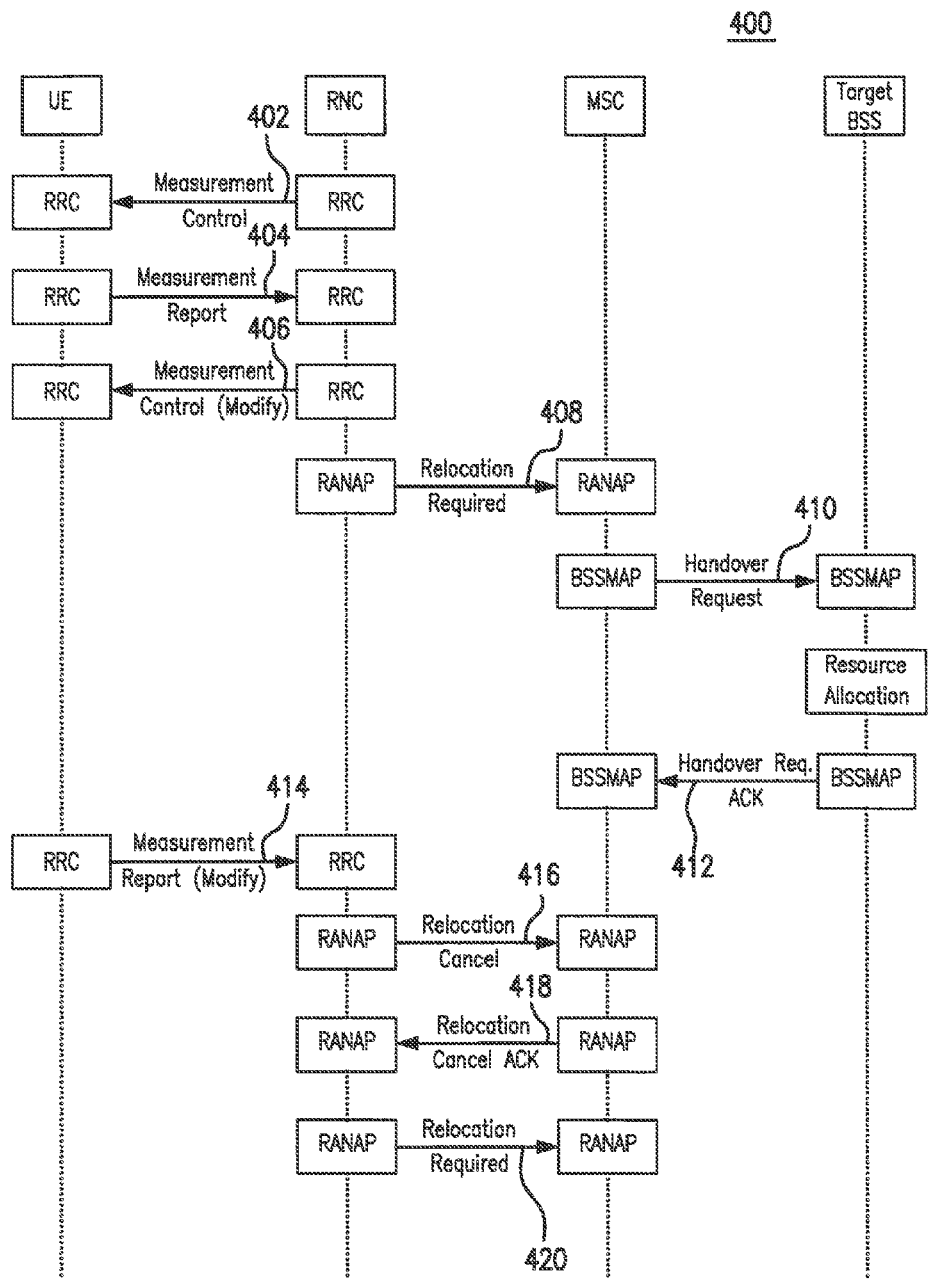
FIG. 4 is a signaling diagram illustrating a handover request in accordance with exemplary embodiments.

Referring now to FIG. 4, a signaling diagram 400 illustrating an intelligent handover request in accordance with exemplary embodiments is provided.

According to exemplary signaling 400, an RNC, which may be an SRNC, such as RNC 208, sends a 3a measurement control message 402 to a UE, such as UE 202. UE 202 then sends a 3a measurement report 404 to RNC 208 that includes information regarding measurements on neighboring cells. The RNC 208 then sends a second 3a measurement control message 406, modifying the relationship between cell identifiers and corresponding node information. Before receiving an updated 3a measurement report from UE 202, the RNC 208 sends a relocation required message 408 to an MSC, such as MSC 210. The MSC then sends a handover request 410 to a target BSS, such as BSS 212. The BSS 212 then allocates resources to UE 202 and sends a handover request acknowledgement 412 to the MSC 210.

However, prior to a relocation command being sent from MSC 210 to RNC 208, a new 3a measurement report 414 in accordance with the second 3a measurement control message is received from UE 202. According to some embodiments, if the report 414 indicates that a new cell has been identified as the strongest cell, a relocation cancel message 416 can be sent to the MSC 210. The MSC 210 acknowledges the cancellation request via a relocation cancellation acknowledgement 418. After which, the RNC 208 can send a new relocation required message 420 to the MSC 210 based on the cell information identified in report 414.

Figure 5:
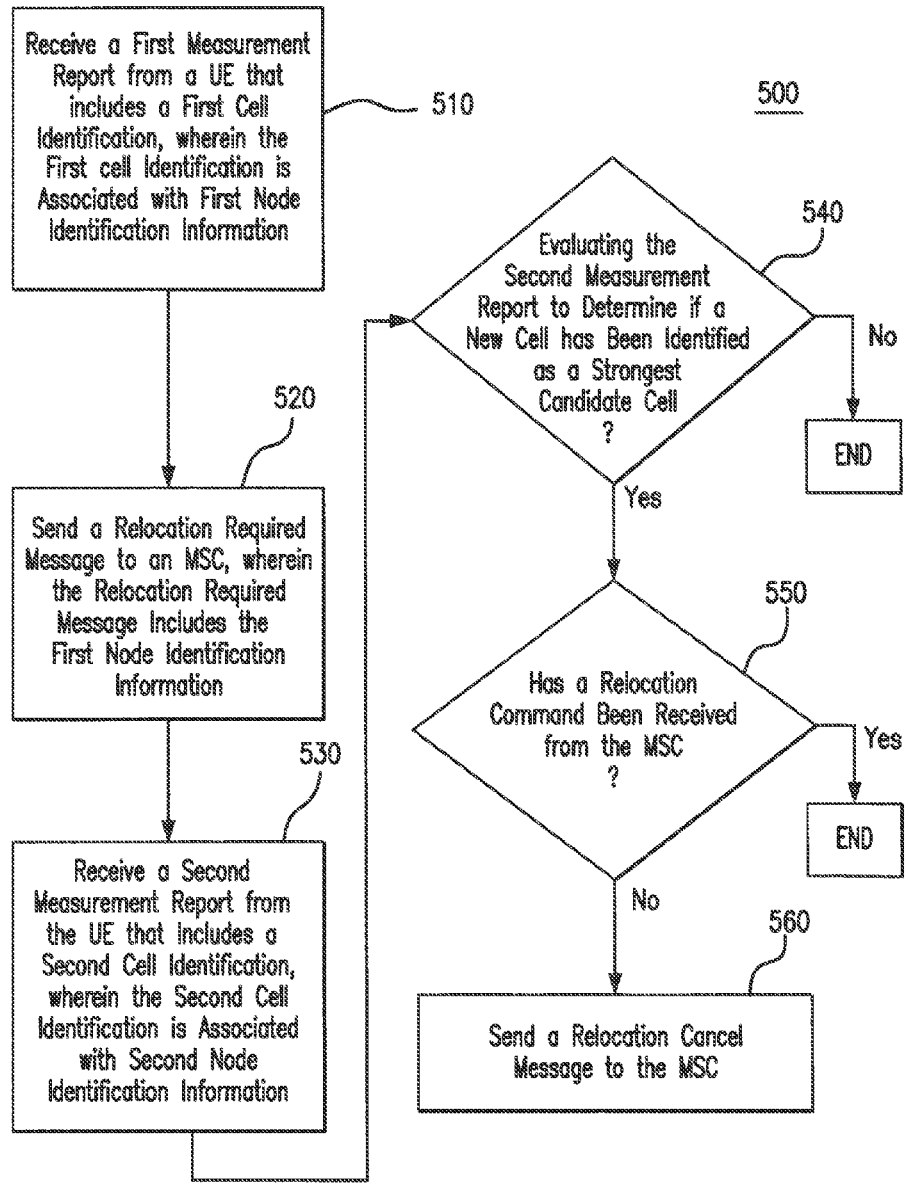
FIG. 5 is a flow chart illustrating a handover request process in accordance with exemplary embodiments.

Referring now to FIG. 5, a process 500 for requesting handover of user equipment in a communication network is provided. The handover may be, for example, of UE 202 in wireless network 200. According to some embodiments, process 500 may be implemented to manage the scenario where an RNC, such as RNC 208, receives an updated measurement report from UE 202 after sending a modified measurement control message to UE 202, but after already sending a relocation required message to an MSC, such as MSC 210 of network 200. If a updated report is received from UE 202 prior to receiving a relocation command from MSC 210, the relocation request can be cancelled, if necessary.

In step 510, RNC 208 receives a first measurement report from UE 202, which includes one or more cell identifications. The first cell identification may be associated with identification information for a first node. For example, the report can identify the strongest neighboring GSM cell and provide information identifying the respective node. The report may be, for instance, a 3a Measurement Report. The measurement report may be received in response to RNC 208 sending a first measurement control message, such as a 3a Measurement Control message, to UE 202. According to some aspects, the first measurement control message associates cell identification information, such as cell-IDs, with identification information about neighboring GSM nodes.

In step 520, RNC 208 sends a relocation required message to MSC 210, which includes one or more of the first node identification information and/or cell identification. For example, RNC 208 can send a relocation required message to the MSC 210 that references the strongest IRAT cell-ID, or node information, received in the report from UE 202 in step 510. The relocation required message may be an RANAP message.

After sending a relocation message to MSC 210, the RNC 208 may receive a subsequent measurement report from the UE 202. For example, the RNC may receive an Event 1a, 1b, or 1c Measurement Report from 202 that includes a Soft Handover candidate for addition or deletion. In response, the RNC 208 may send a message to UE 202 to trigger one or more Soft Handover procedures, such as an Active Set Update message. The RNC 208 may then prepare a new cell identification list, which, for instance, may associate one or more cell-IDs with new node identification information and send a modified measurement control message to UE 202. However, according to certain embodiments, the IRAT cell-ID received in step 510 may be preserved, such that when the modified measurement control message is sent to UE 202, the cell identification and corresponding node information is retained. Measurement control and measurement report messages may be communicated, for example, according to the RRC protocol.

In step 530, RNC 208 receives a second measurement report from UE 202. The second measurement report may be, for example, in response to a modified measurement control message sent following an Active Set Update. According to some embodiments, the second measurement report, which may be a 3a Measurement Report, includes a second cell identification. The second cell identification may be associated with different node information from the first node information of step 510, for example, the second measurement report may identify a second node. The first and second node identification information may include information regarding base stations, such as base station 214 or BSS 212, and/or information regarding broadcast channel. For example, the first and second node identification information can each include a combination of base station identify code (BSIC) and broadcast control channel (BCCH) information.

In step 540, the RNC 208 evaluates the second measurement report to determine whether a different cell/node from the cell/node indicated by the relocation required message of step 520 has been identified as a new strongest cell/node. Evaluation of whether a different cell/node is the strongest, may include, for instance evaluation of one or more Received Signal Strength Indicators (RSSI). For instance, according to certain aspects, the strongest cell/node may be that having the largest reported gsm-CarrierRSSI.

If a new cell/node is not identified in step 540, the process 500 can end, as a request cancellation may not be required. However, if a new cell/node has been identified as the strongest, the process 500 continues to step 550, where it is determined whether a relocation command has been received from the MSC 210. If a relocation command has already been received, the process 500 can end, as a request cancellation may not be effective. However, if not, the process can proceed to step 560.

In step 560, the RNC 208 sends a relocation cancel message to MSC 210. The relocation cancel message may, for instance, request that the MSC 210 unreserve resources from a target cell, such as BSS 212, which may be part of a GSM RAT.

Figure 6:
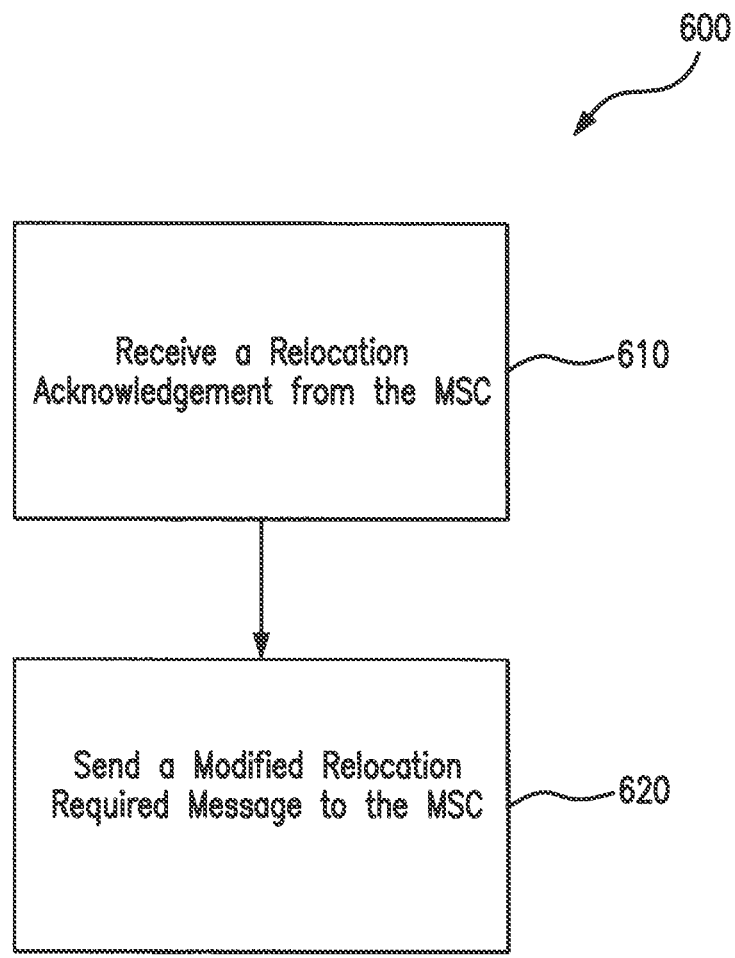
FIG. 6 is a flow chart illustrating a handover request process in accordance with exemplary embodiments.

Referring now to FIG. 6 and process 600, according to some embodiments, following the sending of a relocation cancel message to MSC 210, for instance, as described with respect to step 560 of process 500, an RNC 208 may receive a relocation cancellation acknowledgement from MSC 210 in step 610. In step 620, the RNC 208 may then send a modified relocation required message to the MSC, which may include, for instance, one or more of the second cell identification or identification information regarding the second node of step 530 of process 500. This can ensure that the best cell measured by UE 202 is used for handover resource allocation.

Figure 7:
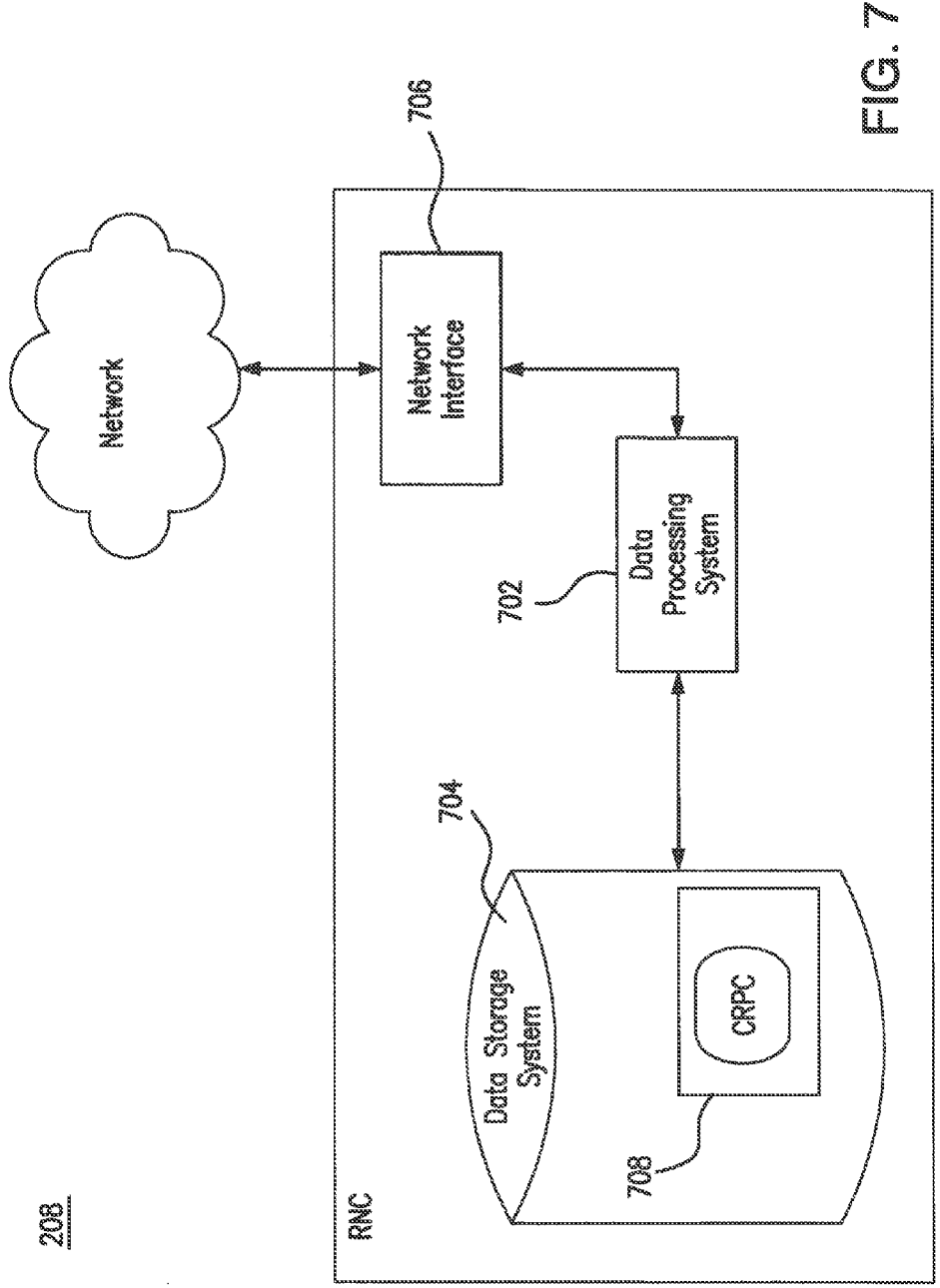
FIG. 7 is a block diagram of a radio network controller in accordance with exemplary embodiments.

FIG. 7 illustrates a block diagram of an exemplary Radio Network Controller (RNC), such as RNC 208 shown in FIG. 2. As shown in FIG. 7, the RNC 208 may include: a data processing system 702, which may include one or more microprocessors and/or one or more circuits, such as an application specific integrated circuit (ASIC), field-programmable gate arrays (FPGAs), and the like; a network interface 706 connected to a network; and a data storage system 704, which may include one or more non-volatile storage devices and/or one or more volatile storage devices (e.g., random access memory (RAM)).

In embodiments where data processing system 702 includes a microprocessor, computer readable program code (CRPC) 708 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 702 to perform steps described above (e.g., steps described above with reference to the flow charts shown in FIGS. 5, 6, and 10). In other embodiments, the RNC 208 is configured to perform steps described herein without the need for code. That is, for example, data processing system 702 may consist merely of one or more ASICs. Hence, the features of the present invention described herein may be implemented in hardware and/or software. For example, in particular embodiments, the functional components of the base station described above may be implemented by data processing system 702 executing computer instructions, by data processing system 702 operating independent of any computer instructions, or by any suitable combination of hardware and/or software.

Figure 8:
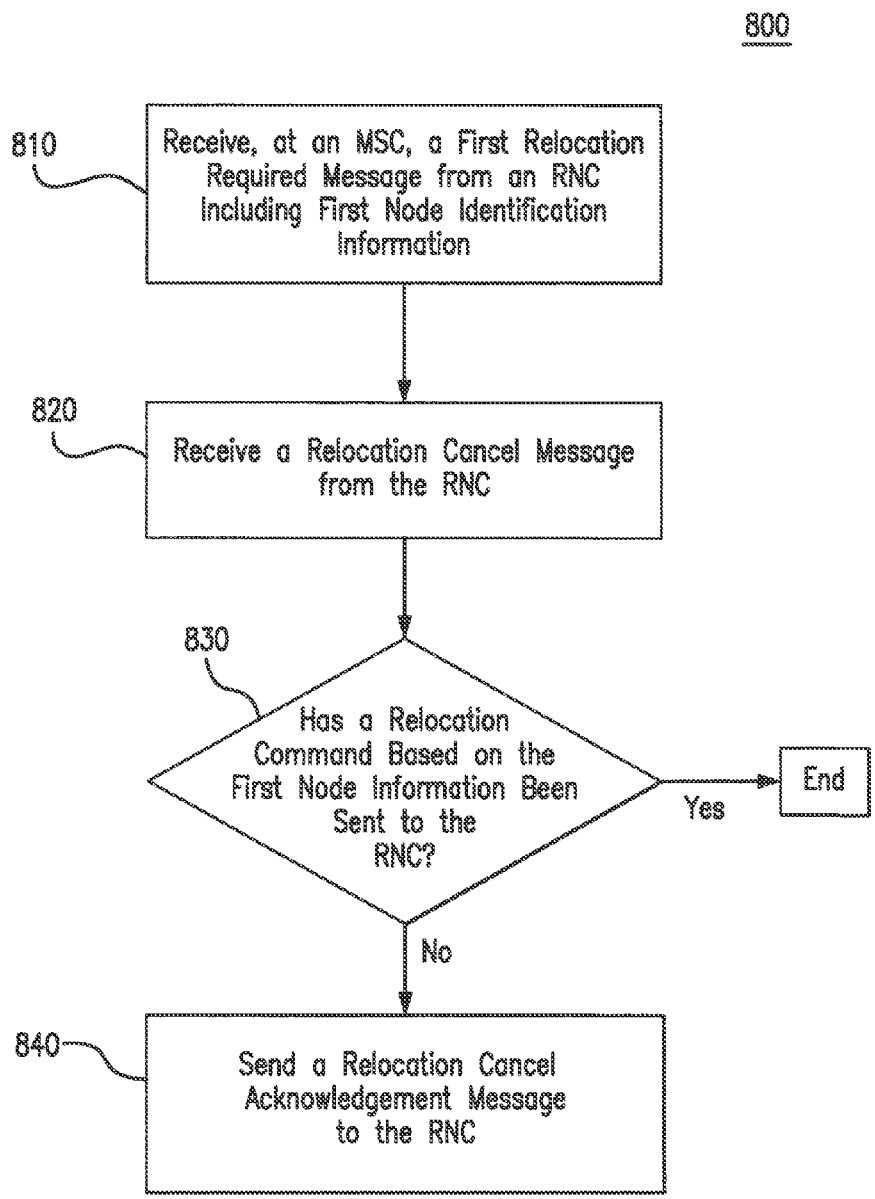
FIG. 8 is a flow chart illustrating a handover management process in accordance with exemplary embodiments.

Referring to FIG. 8, a process 800 for managing a handover request in accordance with some embodiments is provided. The process may be performed, for instance, by MSC 210 to manage a handover request relating to UE 202 and its serving RNC 208.

In step 810, the MSC receives a first relocation required message from RNC 208. The relocation request message may include, for instance, information identifying a first node as a potential handover target for resource allocation. The message may indicate, for example, BSS 212 and/or base station 214. According to certain aspects, node identification information can each include a combination of BSIC and BCCH information. The relocation required message may be an RANAP message.

According to some embodiments, The MSC 210 may then generate a BSS Management Application sub-Part (BSS-MAP) handover request message, which is sent to the target BSS 212. When the BSS 212 receives the handover request message, it can then take any necessary steps to allow the UE 202 to access the radio resources of the BSS. If resource allocation has been completed, the BSS 212 may return a handover request acknowledgement to the MSC 210, which will in turn send a relocation command to RNC 208.

In step 820, the MSC 210 receives a relocation cancel message from RNC 208. The relocation cancel message may be, for example, a request to unreserve any allocated resources in BSS 212.

In step 830, the MSC 210 determines whether a relocation command has been sent to the RNC 208. If the relocation command has already been sent, the process 800 can end.

If the MSC 210 determines that a relocation command has not been sent to RNC 208, in step 840, a relocation cancel acknowledgement is sent to the RNC 208. The MSC 210 may also unreserve allocated resources to the UE 202 in a target cell.

According to certain embodiments, the MSC 210 may subsequently receive a second relocation required message from the RNC 208, which includes the identification of a second node. The MSC 210 then may send a handover request to another base station sub-system based on the second node identification information. For instance, the other base station sub-system may be the best cell measured by UE 202, such as a GSM cell, following an Active Set Update.

Figure 9:
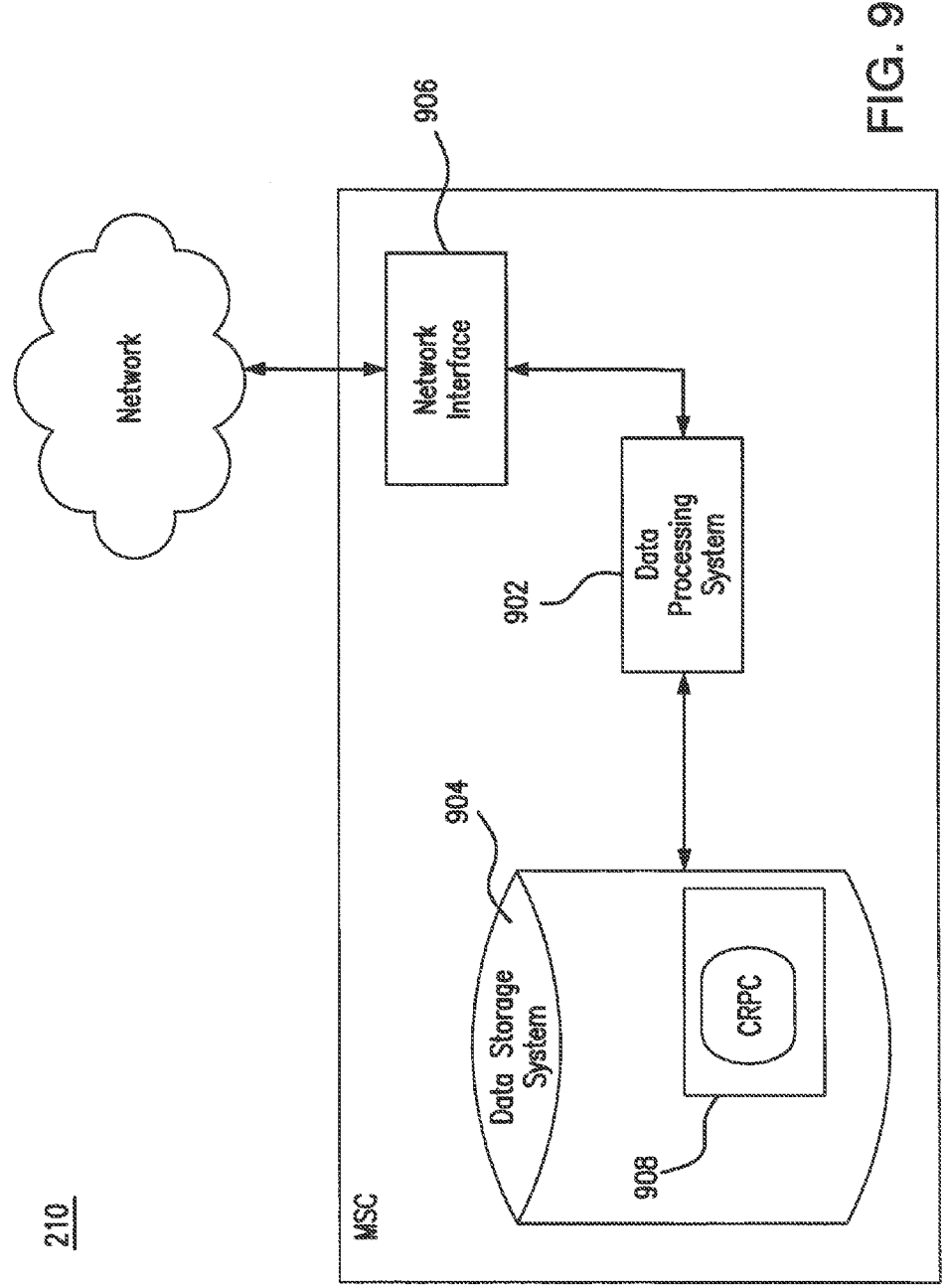
FIG. 9 is a block diagram of a mobile switching center in accordance with exemplary embodiments.

FIG. 9 illustrates a block diagram of an exemplary Mobile Switching Center (MSC), such as MSC 210 shown in FIG. 2. As shown in FIG. 9, the MSC 210 may include: a data processing system 902, which may include one or more microprocessors and/or one or more circuits, such as an application specific integrated circuit (ASIC), field-programmable gate arrays (FPGAs), and the like; a network interface 906 connected to a network; and a data storage system 904, which may include one or more non-volatile storage devices and/or one or more volatile storage devices (e.g., random access memory (RAM)).

In embodiments where data processing system 902 includes a microprocessor, computer readable program code (CRPC) 908 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 902 to perform steps described above (e.g., steps described above with reference to the flow chart shown in FIG. 8). In other embodiments, the MSC 210 is configured to perform steps described herein without the need for code. That is, for example, data processing system 902 may consist merely of one or more ASICs. Hence, the features of the present invention described herein may be implemented in hardware and/or software. For example, in particular embodiments, the functional components of the base station described above may be implemented by data processing system 902 executing computer instructions, by data processing system 902 operating independent of any computer instructions, or by any suitable combination of hardware and/or software.

According to some embodiments, a failed IRAT handover can be prevented by ensuring that the UE is asked to handover to a target cell that it has already measured, and that resource allocation in the BSS is made in the correct cell. For instance, an RNC, such as RNC 208, can maintain cell identification and corresponding node information when an updated measurement control message is sent to UE 202.

Figure 10:
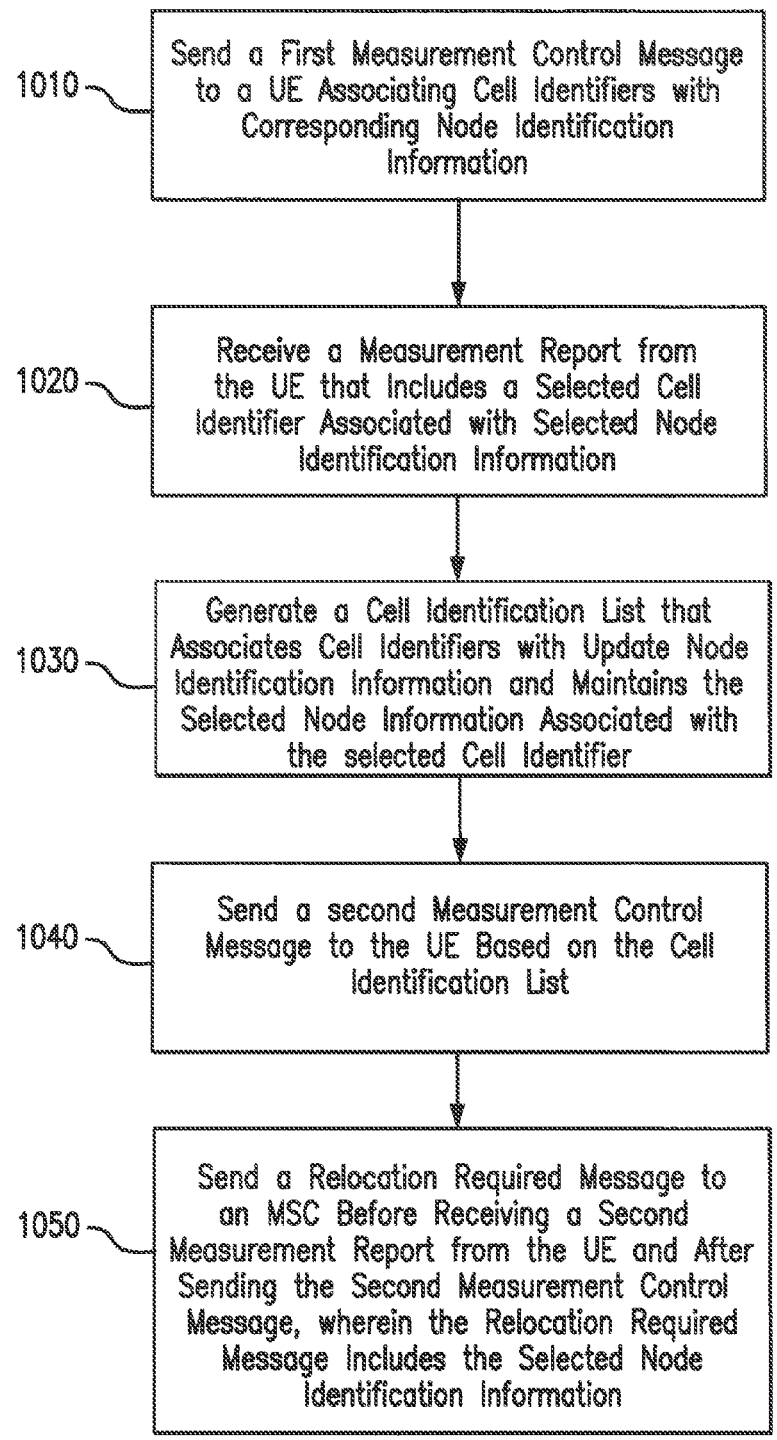
FIG. 10 is a flow chart illustrating a handover request process in accordance with exemplary embodiments.

Referring now to FIG. 10, a process 1000 is provided for requesting handover, for instance, IRAT handover, of a UE in a communication network. For instance, process 1000 may be performed by RNC 208 and applied to UE 202 in network 200 of FIG. 2. According to certain aspects, process 1000 may be used to provide intelligent handover when RNC 208 does not receive an updated measurement report from UE 202, such as a 3a Measurement Report, before sending a relocation required message to MSC 210, but after sending an updated measurement control message.

In step 1010, RNC 208 sends a first measurement control message to UE 202, which associates cell identifiers with corresponding node identification information. For instance, the message may be a 3a Measurement Control message and associate a first cell-ID with a first node, such as a target node BSS 212 and/or base station 214. The identification information may include information regarding base stations, such as base station 214 or BSS 212, and/or information regarding broadcast channel. For example, the first node identification information can include a combination of base station identify code (BSIC) and broadcast control channel (BCCH) information.

In step 1020, RNC 208 receives a first measurement report, such as a 3a Measurement Report, from UE 202 that includes a selected cell identifier, which is associated with node information corresponding to the selected cell identifier. The selected cell identifier may represent, for example, the strongest target cell. The report may include one or more IRAT cell-IDs, and according to some embodiments, the cell IDs may be of the form interRATCell-ID "X."

According to some embodiments, following receipt of the first measurement report in step 1020, the RNC 208 may receive a report from UE 202 that includes one or more Soft Handover candidates for addition, deletion, and/or replacement. The report may be, for example, an Event 1a, 1b, or 1c Measurement Report. The RNC 208 may then send an Active Set Update to UE 202, in order to trigger a Soft Handover procedure.

In step 1030, the RNC 208 generates a cell identification list that associates cell identifiers with updated node identification information. For instance, one or more of the cell identifiers of step 1010 may be updated to correspond to different nodes, as indicated by different node identification information. However, according to some embodiments, the RNC 208 does not change the corresponding node information for the selected cell identifier of step 1020, thereby maintaining the selected node information.

In step 1040, the RNC 208 sends a second measurement control message to UE 202, based on the generated cell identification list.

In step 1050, the RNC 208 sends a relocation required message to MSC 210 before receiving a relocation command from MSC 210 and before receiving a second measurement report from the UE 202. Although the relocation required message is sent to the MSC 210 after a second measurement control message was sent to the UE 202, because the selected node information was maintained, the request is based on the proper cell-ID and corresponding information. Thus, handover may be improved.

According to a non-limiting example, if an SRNC sends a new 3a Measurement Control message to a UE instructing the UE to add or remove certain interRATcells, for instance, following an Active Set Update, before sending an RANAP Relocation Required message to an MSC, the RNC can maintain the interRATCellID which was reported back by the UE in a previous 3a Measurement Report. The report could, for example, include a BSIC verified as having the strongest gsm-CarrierRSSI.

FIG. 11 is an exemplary illustration of maintaining cell-ID and corresponding node information in accordance with some embodiments.

According to some embodiments, an RNC may have one or more mechanisms to "tag," or otherwise keep track of a cell identifier, such as an interRATCellID, corresponding to the strongest target cell. The determination of a strongest cell may be based on, for instance, a gsm-CarrierRSSI reported through an earlier 3a Measurement Report. In some instances, the selected cell-ID should not be modified unless a new 3a Measurement Report has been received by the RNC before sending an RANAP Relocation Required message to the MSC. This ensures that the Relocation Required message is sent with reference to the interRATCellID which has been reported as the strongest GSM cell by the UE.

Referring now to example of FIG. 11, initial cell identification and corresponding node information 1102 may be set up. For example, interRATcellID 11 may be associated with a node described by ncc 5 bcc 4 bcch-AFRCN 45 at a first time, t=1. At a second time, t=2, the RCN may subsequently modify the association of 1102, and replace it with node information 1104. In 1104, interRAT cellID 11 is associated with a node described by ncc 0 bcc 3 bcch-AFRCN 36. In response to a measurement control message (modify) sent by the RNC, which associates cell IDs according to information 1104, at time t=3 a UE may report, for instance, via a 3a Measurement Report, that the node corresponding interRATcellID 11 is the strongest target cell. At t=4, the RNC may prepare a new IRAT Cell-ID list having association 1106, for instance, following an Active Set Update message triggering a Soft Handover. However, the new list is generated while retaining the information for the selected cell (corresponding to interRATcellID 11). Specifically, the corresponding node information ncc 0 bcc 3 bcch-AFRCN 36 may be maintained despite the generation of a new list.

With respect to the illustration of FIG. 11, if a UE has sent the 3a Measurement Report after receiving 3a Measurement Control—Modify (1), and has reported bsicReported verifiedBSIC: 11, it implies that the UE has measured the GSM Cell having ncc 0 bcc 3 bcch-AFRCN 36 as the strongest GSM candidate cell. If there is subsequent 3a Measurement Control Message (modify) sent to the UE, the interRATCellID which was reported in the prior 3a Measurement Report should not be modified in some embodiments.

Figure 12:
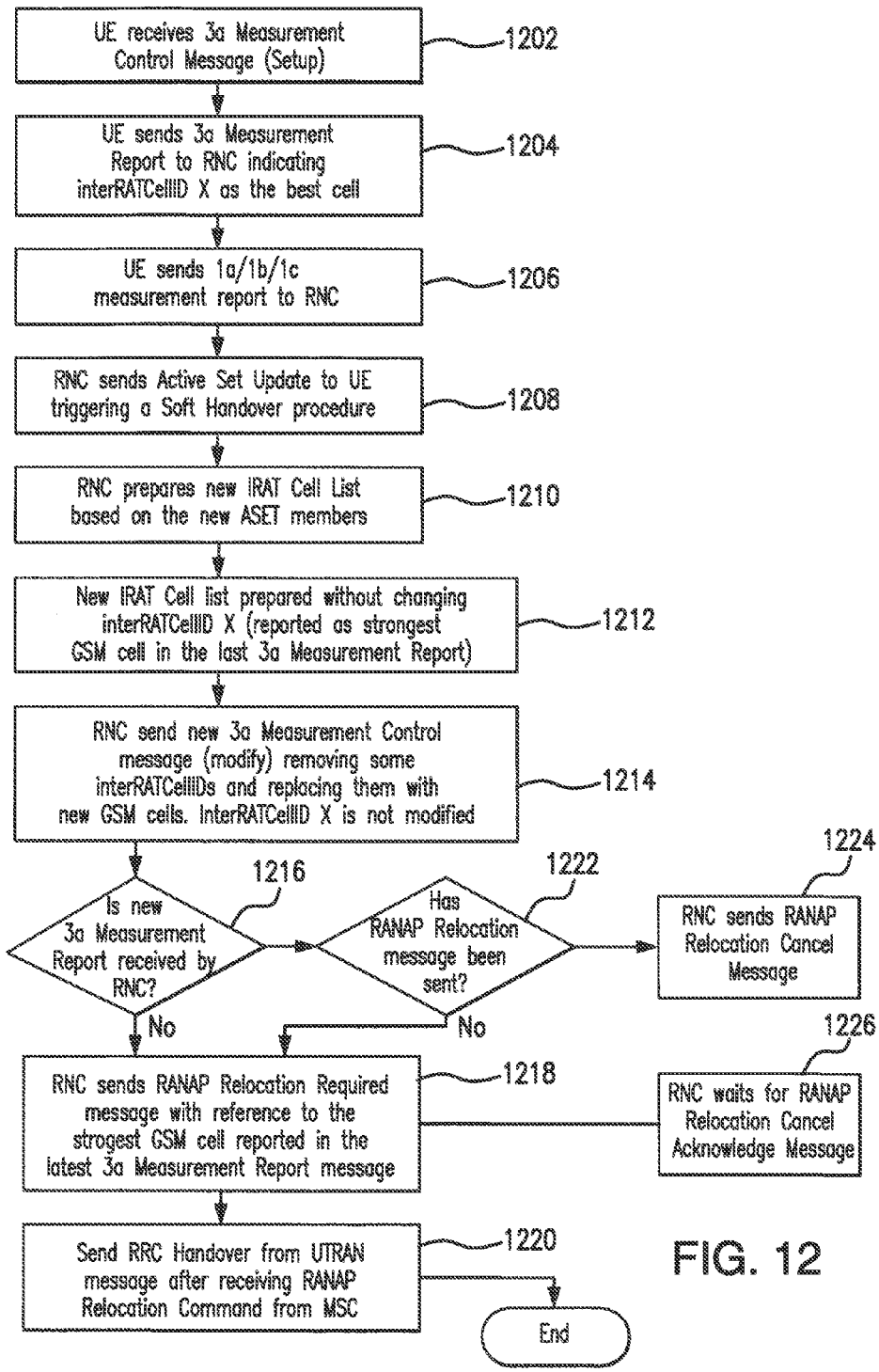
FIG. 12 is a flow chart illustrating a handover request process in accordance with exemplary embodiments.

Referring now to FIG. 12, an exemplary process 1200 for intelligent IRAT handover decisions and management is provided in accordance with some embodiments of the present disclosure.

In step 1202, a UE, such as UE 202, receives a 3a Measurement Control Message (setup), which associates a number of cell identifiers with node identification information. The message may be received, for instance, from RNC 208.

In step 1204, the UE 202 sends a 3a Measurement Report to the RNC 208, which indicates that the cell corresponding to interRAT CellID "X" is the best cell.

In step 1206, the UE 202 sends a measurement report to the RNC 208 based on a 1a, 1b, and/or 1c Event.

In step 1208, the RNC 208 sends an Active set update to the UE 202, triggering a Soft Handover procedure.

In step 1210, the RNC 208 prepares a new IRAT Cell List based on the new ASET members. As described by step 1212, the new IRAT Cell List is prepared without changing interRAT CellID X, which was reported as the strongest GSM cell in the last 3a Measurement Report of step 1204.

In step 1214, the RNC 208 sends a new 3a Measurement Control message (modify), which removes some interRAT CellIDs and replaces them with new GSM cells. Again, the interRAT CellID X is not modified.

In step 1216, RNC 208 determines whether a new 3a Measurement Report has been received. If not, the process 1200 proceeds to step 1218 and the RNC 208 sends an RANAP Relocation Required message with reference to the strongest GSM cell reported in the latest 3a Measurement Report (step 1204). In step 1220, the RNC 208 sends an RRC Handover from UTRAN message to the UE after receiving an RANAP Relocation Command from MSC 210.

If it is determined in step 1216 that a new 3a Measurement Report has been received by the RNC 208, the process 1200 proceeds to step 1222, where it is determined whether an RANAP Relocation Message has been sent. If not, the process 1200 proceeds to steps 1218 and 1220 as described above. Otherwise, in step 1224, the RNC sends an RANAP Relocation Cancel message to the MSC 210. The RNC then waits for an RANAP Relocation Cancel Acknowledgment in step 1226 before proceeding to steps 1218 and 1220.

According to some aspects, the disclosed methods and device give a better probability of IRAT handover success by ensuring that the best reported cell in the latest 3a Measurement Report is used as the IRAT handover candidate. Disclosed mechanisms will be particularly helpful in sub-optimal RF coverage areas where there is no dominant 3G server and frequent Active Set Updates occur (e.g., based on server addition, deletion and/or replacement) causing rapid changes in the combined IRAT Neighbor List, which is transmitted to the UE through the 3a Measurement Control Message (modify).

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for requesting handover of a user equipment (UE) in a network, comprising:
   sending, from a radio network controller (RNC), a first measurement control message to said UE that associates a plurality of cell identifiers with corresponding node identification information, the plurality of cell identifiers including a first cell identifier associated with first node identification information and a second cell identifier associated with second node identification information;
   receiving, at said RNC, a first measurement report from said UE that identifies the first cell identifier as a selected cell identifier from said plurality of cell identifiers;
   generating a cell identification list that associates the second cell identifier with updated node identification information and that maintains the association between the first cell identifier that was selected from the plurality of cell identifiers and the first node identification information;
   sending, from said RNC, a second measurement control message to said UE based on said cell identification list; and
   after sending said second measurement control message and before receiving a second measurement report from the UE, sending from said RNC, a relocation required message to a mobile switching center (MSC) to request handover of the UE to a target cell,
   wherein said relocation required message includes said selected cell identifier and said first node identification information to identify the target cell.

2. The method of claim 1, further comprising:
   receiving, at said RNC, the second measurement report from said UE, wherein the second measurement report includes a new cell identifier;
   evaluating said second measurement report to determine if a cell corresponding to the new cell identifier has been identified as a strongest candidate for being the target cell for handover; and
   if the cell has been identified as the strongest candidate for being the target cell, and said RNC has not received a relocation command from said MSC, sending a relocation cancel message to said MSC.

3. The method of claim 2, further comprising:
   after said sending of the relocation cancel message to said MSC, receiving a relocation cancel acknowledgement message from said MSC; and
   sending, from said RNC, an updated relocation required message to said MSC,
   wherein said updated relocation required message includes node identification information associated with said new cell identifier.

4. The method of claim 1, wherein node identification information includes a combination of base station identity code (BSIC) and broadcast control channel (BCCH) information.

5. The method of claim 1, wherein said measurement report includes a carrier receive signal strength indicator (RSSI).

6. The method of claim 1, wherein said sending of said second measurement control message is based at least in part on an Active Set Update.

7. The method of claim 1, wherein said RNC is a serving radio network controller (SRNC) of said UE.

8. The method of claim 3, wherein
   the first measurement report corresponds to the first measurement control message, and
   the second measurement report corresponds to the second measurement control message.

9. A method for requesting handover of a user equipment (UE) in a network, comprising:
   receiving, at a radio network controller (RNC), a first measurement report from said UE that includes a first cell identification, wherein said first cell identification is associated with first node identification information corresponding to a first cell;
   sending, from said RNC, a relocation required message to a mobile switching center (MSC) to request handover of the UE to a target cell, wherein said relocation required message includes said first node identification information to identify the target cell;
   receiving, at said RNC, a second measurement report from said UE that includes a second cell identification, wherein said second cell identification is associated with second node identification information corresponding to a new cell;
   evaluating said second measurement report to determine if the new cell has been identified as a strongest candidate for being a target cell for handover of the UE; and
   if the new cell has been identified as the strongest candidate cell, and said RNC has not received a relocation command corresponding to the relocation required message from said MSC, sending a relocation cancel message corresponding to the relocation required message to said MSC.

10. The method of claim 9, further comprising:
    receiving, at said RNC, a relocation cancel acknowledgement message corresponding to the relocation cancel message from said MSC; and
    sending, from said RNC, a modified relocation required message to said MSC, wherein said relocation required message includes said second node identification information.

11. The method of claim 9, wherein said first and second node identification information each include a combination of base station identity code (BSIC) and broadcast control channel (BCCH) information.

12. The method of claim 9, wherein said handover is an inter radio access technology (IRAT) handover and said first measurement report includes information that indicates whether a handover event has occurred.

13. The method of claim 10, wherein
the first measurement report corresponds to a first measurement control message, and
the second measurement report corresponds to a second measurement control message.

14. A method for managing a handover request, comprising:
receiving, at a mobile switching center (MSC), a first relocation required message from a radio network controller (RNC) including first node identification information;
the MSC receiving, from said same RNC from which the first relocation required message is received, a relocation cancel message corresponding to the first relocation required message; and
the MSC sending a relocation cancel acknowledgement message corresponding to the relocation cancel message to said RNC,
wherein the MSC does not transmit any relocation command responding to the first relocation required message as a result of the MSC having received the relocation cancel message, and
wherein the first relocation required message is received in response to the RNC receiving a first measurement report from a user equipment (UE), and the relocation cancel message is being received in response to the RNC receiving a second measurement report from the UE.

15. The method of claim 14, further comprising:
receiving, at said MSC, a second relocation required message from said RNC including second node identification information; and
sending a handover request to a base station sub-system based on said second node identification information.

16. The method of claim 14, wherein the relocation cancel message includes a request to the MSC to unreserve resources from a target cell.

17. The method of claim 14, further comprising the MSC determining, after receiving the relocation cancel message, that it has not sent any relocation command corresponding to the first relocation required message.

18. The method of claim 15, wherein the first measurement report identifies a first cell as a strongest candidate for being a target cell for handover, and wherein the second measurement report identifies a different cell as the strongest candidate for being the target cell for handover.

* * * * *